3,484,609
METHOD FOR CHLORINE LOGGING WHEREIN BOTH CHLORINE AND CALCIUM ARE LOGGED USING A PLURALITY OF SELECT NARROW WINDOWS
William C. Pritchett and Orland J. Gant, Jr., Dallas, and Ray L. Calkins, Richardson, Tex., assignors to Atlantic Richfield Company, Philadelphia, Pa., a corporation of Pennsylvania
Filed May 13, 1966, Ser. No. 549,946
Int. Cl. G01t 1/20, 1/16; H01j 39/18
U.S. Cl. 250—71.5                                    4 Claims

ABSTRACT OF THE DISCLOSURE

A chlorine logging system especially adapted for use in logging carbonate formations. Select narrow windows in the broad range of 5.0 to 6.5 mev. are taking as determinative of chlorine and calcium, respectively.

---

The present invention relates to new and useful methods for conducting chlorine logging operations and to novel apparatus for performing such methods. More specifically, the invention relates to methods for chlorine logging whereby response to chlorine is improved and concerns an improved chlorine logging tool designed to pass through a borehole and survey subsurface formations.

The technique of chlorine logging is used extensively to log or map existing boreholes to determine new producing formations. One is able to indicate porous zones, i.e. formations which have a high fluid content, and predict whether such zones contain substantial amounts of salt water. A formation which has a high fluid content and a low concentration of salt (chlorine) may be assumed to contain petroleum or related materials.

A chlorine log of a well is obtained by bombarding the formation penetrated by the well with fast neutrons and measuring response in terms of prompt capture gamma rays in a given energy range. Formation fluids, earth materials, etc. moderate the fast neutrons until they reach thermal energy and become subject to capture by atoms of various subsurface elements. As a result of such captures gamma rays are emitted which have energies characteristic of the absorbing elements. Since chlorine is a principal capturer of thermal neutrons because of its large capture cross section, the chlorine content of a formation can be determined from the count rate of returned gamma rays with energies characteristic of chlorine.

In application Ser. No. 480,239, now U.S. Patent 3,368,075 one of the present applicants in conjunction with others proposed that an energy range of 5.00 to 6.50 mev. be utilized for scanning the capture gamma ray spectrum for chlorine. This window has proved effective for logging sandstones of the Gulf Coast; however, inconclusive results have generally been obtained for limestones, dolomites and other rock types in West Texas and New Mexico.

In application Ser. No. 549,945 (filed of even date herewith) applicants disclosed a chlorine logging operation utilizing select narrow window widths, e.g. widths of 0.25 mev. or thereabouts, within the broad range of 5.00–6.50 mev. as indicative of chlorine. More specifically, applicants were able to establish that windows having energy ranges of 5.00–5.25, 5.50–5.75, and/or 6.00–6.25 mev. are critical for determining the chlorine content of carbonate formations.

Although the logging system claimed in application Ser. No. 549,945 has generally proved effective and represents a significant improvement over prior art procedures, its usefulness is somewhat impaired because of the wide variation in rock matrices in West Texas and New Mexico. This region of prime exploratory interest has formations varying from $CaCO_3$ (limestone) to $CaMg(CO_3)_2$ (dolomites) to $SiO_2$ (sand stone chert conglomerate etc.) and all gradations in between. Also deposits of $CaSO_4$ (largely as anhydrite) may complicate matters of log interpretation.

What is needed is a proficient way or means whereby chlorine and calcium can be determined during the same logging operation. In interpreting the chlorine log compensation could then be made for the calcium content as it vacillates from formation to formation.

Accordingly, it is an object of the present invention to provide a method and means for conducting chlorine logging operations whereby response to chlorine is improved and interference due to calcium is reduced.

Another object of this invention is to provide a method and apparatus for chlorine logging of carbonate formations whereby chlorine response is improved.

Another object is to provide critical energy ranges for viewing the prompt capture gamma ray spectrum for chlorine and calcium respectively during chlorine logging operations.

Another object is to provide a chlorine logging tool capable of being used to practice the methods of this invention.

Another object is to provide a downhole pulse height analyzer for determining whether detected gamma rays have energies within preselected critical ranges characteristic of chlorine and calcium respectively.

Other objects and advantages of the invention will be apparent from the following description and the accompanying drawings, wherein.

The invention contemplates a chlorine logging operation utilizing select narrow window widths within the broad range of 5.00–6.50 mev. as indicative of chlorine and calcium, respectively. More particularly, windows having energy ranges of 5.00–5.25, 5.50–5.75 and/or 6.00–6.25 mev. are scanned in order to determine chlorine content and windows of 5.25–5.50, 5.75–6.00, and/or 6.25–6.50 mev. are analyzed to determine calcium content. In another aspect of the invention certain functions of the determined chlorine and calcium contents are taken as indicative of various aspects of the lithology of the formation being logged.

The general method of the invention may be described as bombarding a subsurface formation with fast neutrons; detecting prompt capture gamma rays emitted in response to the neutrons which are moderated by the formation; analyzing a portion of the energy spectrum of the gamma rays over the interval of 5.00–6.50 mev. to determine pulse signals for a plurality of windows therein of which at least one is characteristic of chlorine and at least one is characteristic of calcium; transmitting information regarding the pulse signals uphole; and recording the information as indicative of chlorine and calcium in the formation.

An indication of the salinity of the formation can be obtained from a function based on the difference of the recorded values for calcium and chlorine. Optionally salinity can be determined from a function based on the ratio of the recorded values for chlorine and calcium. Also an indication of the porosity of the formation can be obtained from a function based on the difference of the recorded value for calcium and approximately half the recorded value for chlorine.

The basic apparatus comprising the invention may be described as a logging tool having a neutron source; a scintillation crystal spaced apart from the source; a photomultiplier tube optically coupled to the crystal; amplifying means connected to the output of the tube; and a pulse height analyzer having a chlorine-calcium discriminator means responsive to a portion of the energy spectrum over the interval of 5.00–6.50 mev. which means includes at least three discriminators connected in parallel to the output of the amplifying means for passing pulse signals within at least one window characteristic of chlorine and at least one window characteristic of calcium.

Figure 1:
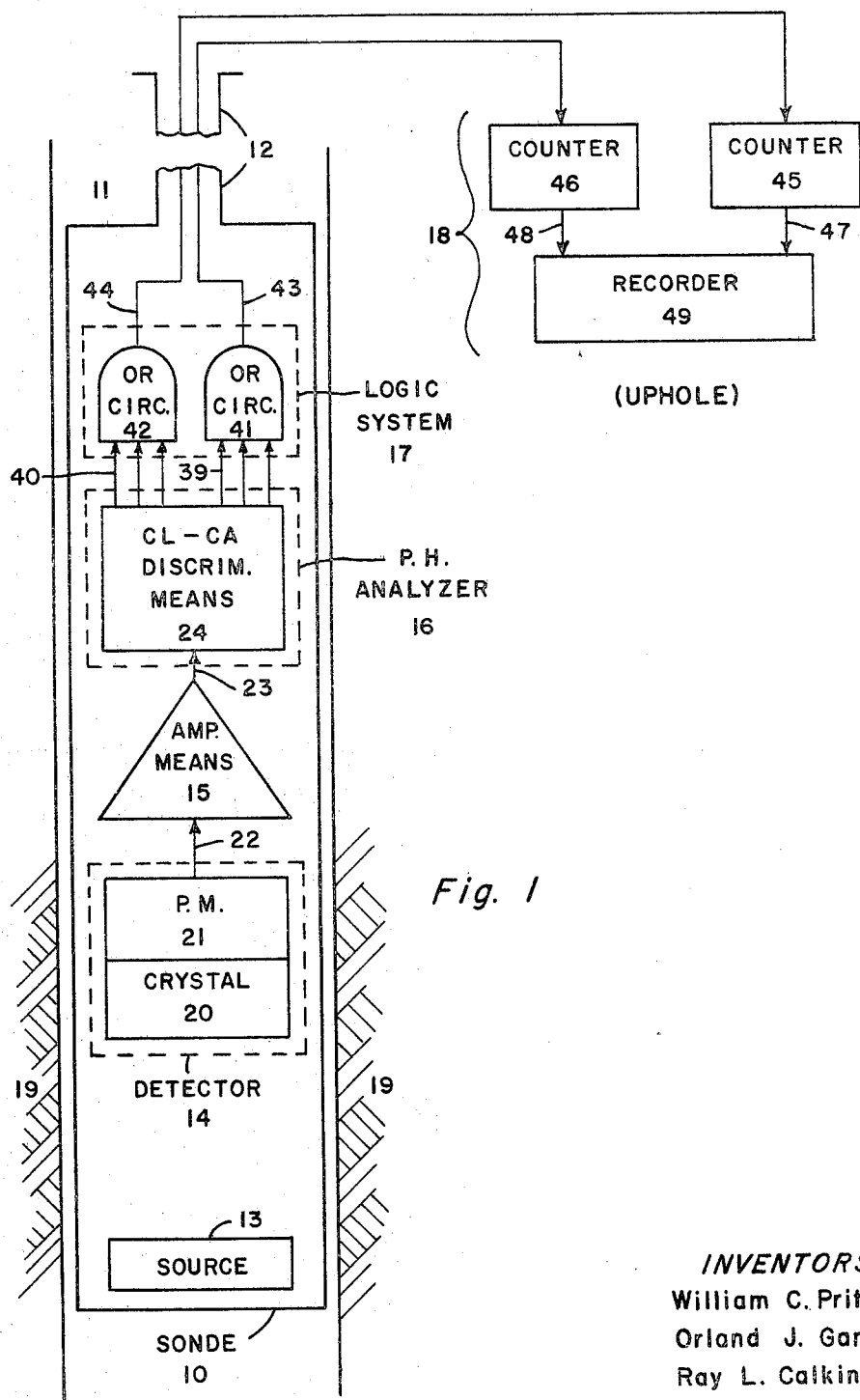
FIGURE 1 depicts a chlorine logging sonde including typical components and shows connection with uphole equipment.

FIGURE 1 shows chlorine logging tool or sonde 10 suspended in borehole 11 by cable or connector 12 which may be wound or unwound to raise or lower the sonde as desired. Sonde 10 includes neutron source 13, detector 14, amplifying means 15, pulse height analyzer 16, and logic system 17. Uphole equipment 18 is electrically connected to the sonde through the supporting cable.

Neutron source 13 is located at the lower end of sonde 10 in a manner such that fast neutrons are directed into formation 19. Examples of suitable sources include plutonium-beryllium and americium-beryllium with a flux strength on the order of $2 \times 10^7$ neutrons/second.

Detector 14 is spaced apart from source 13 and includes scintillation crystal or phosphor 20 having photomultiplier tube 21 optically coupled thereto. The optimum source-crystal spacing will generally be somewhere between 18 and 22 inches depending on the particular source, its strength, the character of the surrounding formations, etc. The crystal is composed of a material such as cesium iodide (activated with thallium or sodium) or sodium iodide (activated with thallium) that produces scintillations, i.e. light flashes, proportional to the energy of the impinging prompt capture gamma rays. Photomultiplier tube 21 converts the scintillations into electrical pulse signals having amplitudes proportional to the energies of the detected gamma rays.

These pulse signals are passed to amplifying means 15 by line 22. The amplifying means generally is composed of one or more amplifying stages and usually includes a variable gain amplifier.

The amplified pulse signals pass via line 23 to pulse height analyzer 16 which determines whether the signals fall within certain preselected energy ranges or windows. Included within analyzer 16 is chlorine-calcium discriminator means 24 which scans the energy spectrum over the interval of 5.00–6.50 mev. for signals characteristic of chlorine and calcium respectively.

Figure 2:
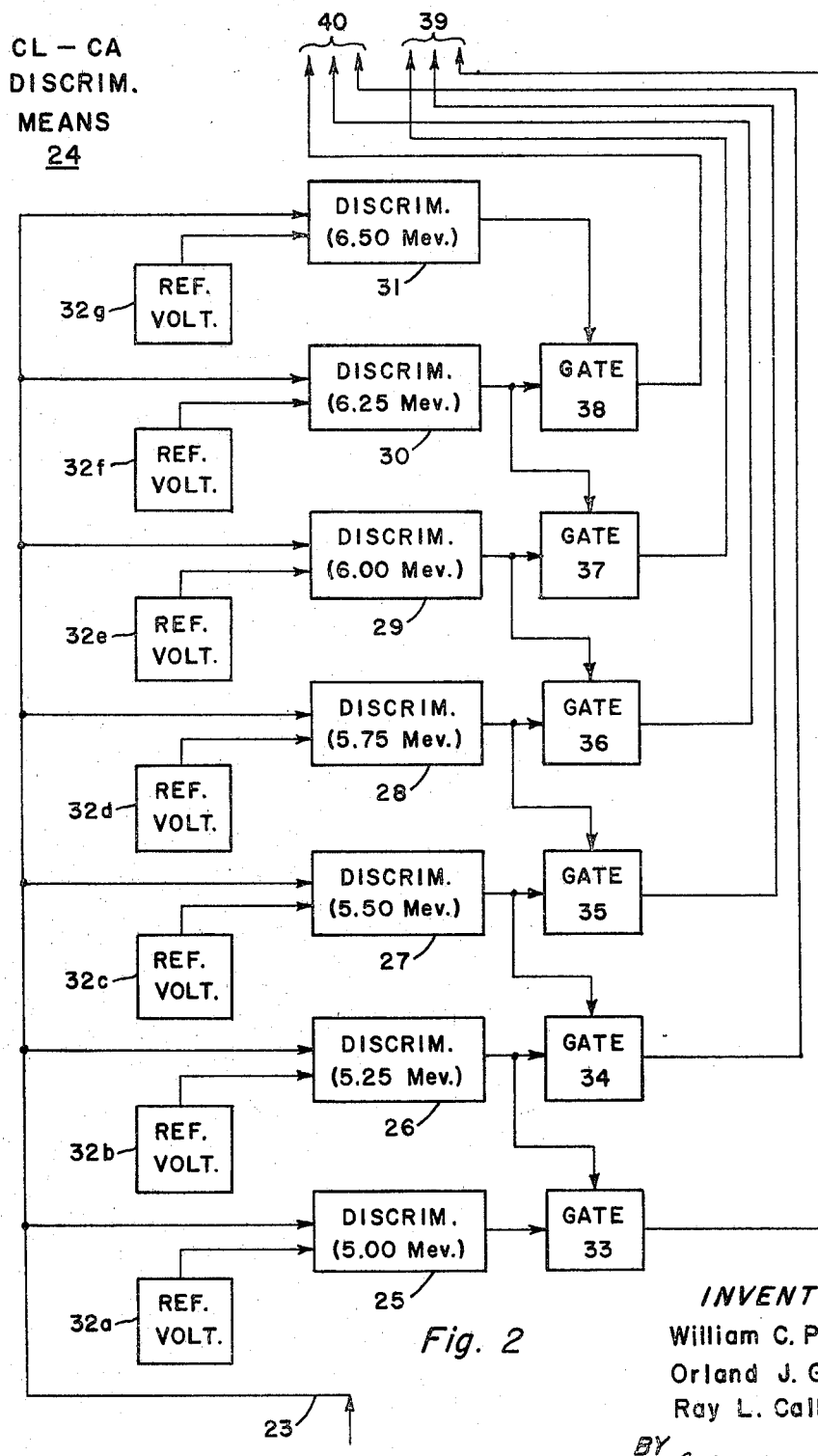
FIGURE 2 is a circuit diagram of the chlorine and calcium discriminator means which is embodied in the invention.

FIGURE 2 presents a circuit diagram of chlorine-calcium discriminator means 24 showing amplitude discriminators 25, 26, 27, 28, 29, 30, and 31 connected in parallel to line 23. Each discriminator is biased with a reference voltage, viz. 32a, 32b, 32c, 32d, 32e, 32f, and 32g. Gates 33, 34, 35, 36, 37, and 38 control the passage of pulses from discriminators 25, 26, 27, 28, 29, and 30, respectively.

Each discriminator generates an output pulse if the input pulse thereto is equal to or greater than the amplitude of the energy level established by its particular reference voltage. The output pulses from discriminators 33, 35, and 37 pass through their associated gating circuits to output lines 39; whereas the output pulses from discriminators 34, 36, and 38 are gated to output lines 40. Additionally, the output pulses from discriminators 26, 27, 28, 29, 30, and 31 act to close the gates of the discriminators immediately below them in amplitude level. Thus, output pulses from discriminators 26, 27, 28, 29, 30, and 31 close gates 33, 34, 35, 36, 37, and 38, respectively.

It follows that the discriminators can be adjusted to define predetermined energy ranges or windows. Discriminators 25 and 26 define a window of 5.00–5.25 mev.; discriminators 26 and 27 establish a window of 5.25–5.50 mev.; discriminators 27 and 28 establish a window of 5.50–5.75 mev.; discriminators 28 and 29 establish a window of 5.75–6.00 mev.; discriminators 29 and 30 establish a window of 6.00–6.25 mev.; and discriminators 30 and 31 establish a window of 6.25–6.50 mev. The 5.00–5.25, 5.50–5.75, and 6.00–6.25 mev. windows are characteristic of chlorine and the 5.25–5.50, 5.75–6.00, and 6.25–6.50 mev. windows are characteristic of calcium.

Referring again to FIGURE 1; lines 39 and 40 pass to downhole logic system 17 where the pulses are combined in various ways to simply the telemetering process. Preferably, logic system 17 includes OR circuit 41 to which lines 39 are connected and OR circuit 42 to which lines 40 are joined. OR circuit 41 produces an output if there is an input on any of lines 39; OR circuit 42 produces an output if there is an input pulse on any of lines 40.

These outputs are transmitted by lines 43 and 44 carried by cable 12 to pulse counters 45 and 46 which are part of surface equipment 18. Lines 47 and 48 connect the outputs of the counters to multichannel recorder 49 which produces a visual or magnetic record of the information transmitted uphole as a function of borehole depth. The recorded information is indicative of the concentrations of chlorine and calcium in the formations being logged.

Our effort to empirically optimize the salinity and porosity measurements in limestone has resulted in measurements nearly independent of each other. If combination B represents the chlorine sensitive windows and combination A represents the calcium sensitive windows, then B–A is indicative of salinity and has minimum porosity and calcium dependence. The ratio B/A is also a good measure of salinity and should be considered as a preferred alternative. The difference A–0.5B is dominantly sensitive to porosity variations and is largely insensitive to salinity changes and, thus, provides a new porosity measurement.

It is understood that the invention is not limited to the specifically disclosed methods and apparatus but fully includes the subject matter as defined by the appended claims and all equivalents thereof.

We claim:
1. A method for chlorine logging in carbonate formations whereby response to chlorine is improved and interference due to calcium is reduced comprising
  (a) bombarding a preselected formation with fast neutrons,
  (b) detecting prompt capture gamma rays emitted in response to said neutrons,
  (c) analyzing the energy spectrum of said gamma rays to determine the pulse signals for windows having energy ranges of about 5.00–5.25 mev., 5.25–5.50 mev., 5.50–5.75 mev., 5.75–6.00 mev., 6.00–6.25 mev., and 6.25–6.50 mev., respectively, and
  (d) recording the totals of the pulse signals determined for the 5.00–5.25 mev., 5.50–5.75 mev., and 6.00–6.25 mev. windows as indicative of chlorine and those for the 5.25–5.50 mev., 5.75–6.00 mev., and 6.25–6.50 mev. windows as indicative of calcium, respectively, in said formation.

2. A method for chlorine logging according to claim 1 where an indication of the salinity of said formation is obtained by subtracting the recorded value for calcium from the recorded value for chlorine.

3. A method for chlorine logging according to claim 1 where an indication of the salinity of said formation is obtained by dividing the recorded value for chlorine by the recorded value for calcium.

4. A method for chlorine logging according to claim 1 where an indication of the porosity of said formation is obtained in subtracting approximately half the recorded value for chlorine from the recorded value for calcium.

References Cited

UNITED STATES PATENTS

| 3,114,835 | 12/1963 | Packard | 250—71.5 |
| 3,211,909 | 10/1965 | Owen | 250—71.5 |
| 3,244,882 | 4/1966 | Baldwin et al. | 250—71.5 |

ARCHIE R. BORCHELT, Primary Examiner

U.S. Cl. X.R.

250—83.3